United States Patent Office 2,697,114
Patented Dec. 14, 1954

2,697,114

STABILIZATION OF ORGANO-SILOXANES

Joseph A. Chenicek, Bensenville, Ill., assignor to Universal Oil Products Company, Chicago, Ill., a corporation of Delaware No Drawing. Original application June 28, 1946, Serial No. 680,065, now Patent No. 2,517,536. Divided and this application February 18, 1950, Serial No. 145,087

18 Claims. (Cl. 260—448.2)

This application is a division of my copending application Serial No. 680,065 filed June 28, 1946, now Patent No. 2,517,536, August 8, 1950.

This invention relates to the stabilization of organo-siloxanes and more particularly to the use of a novel inhibitor to prevent the oxidative deterioration of organo-siloxanes during storage and use, and particularly when exposed to heat and air.

Organo-siloxanes comprise essentially silicon atoms connected to each other by means of oxygen through silicon-oxygen linkages as shown below:

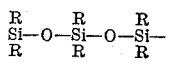

where at least some of the "R" groups are hydrocarbon radicals.

Organo-siloxanes may be prepared by the hydrolysis of a hydrolyzable organo-monosilane followed by partial or complete condensation of the hydrolysis product. They also may be prepared by hydrolyzing and condensing mixtures of different hydrolyzable organo-monosilanes. The organo-siloxanes may be liquid or solid, depending upon the extent of condensation. Liquid organo-siloxanes, when exposed to heat and air for prolonged periods of time, become more viscous and resinous. Solid organo-siloxanes become brittle when exposed to heat and air.

In a broad embodiment the present invention relates to a method of stabilizing an organo-siloxane which comprises incorporating therein a small but effective amount of an inhibitor comprising a phenol having a hydrocarbon substituent in a position ortho to the hydroxyl radical.

In another broad embodiment the present invention relates to a novel composition of matter comprising an organo-siloxane containing from about 0.01% to about 5% by weight of an inhibitor comprising a phenol having a hydrocarbon substituent in a position ortho to the hydroxyl radical.

In one embodiment the present invention relates to a method of stabilizing an organo-siloxane which comprises incorporating therein a small but effective amount of an inhibitor comprising an alkyl phenol having an alkyl substituent in a postion ortho to the hydroxyl radical.

In another embodiment the present invention relates to a novel composition of matter comprising an organo-siloxane containing a small but stabilizing amount of an inhibitor comprising alkyl phenol having an alkyl substituent in a position ortho to the hydroxyl radical.

In a specific embodiment the present invention relates to a novel composition of matter comprising a liquid organo-siloxane containing from about 0.01% to about 5% by weight of 2,4-dimethyl-6-tert-butyl phenol.

The preferred inhibitor of the present invention comprises an alkyl phenol having an alkyl substituent in a position ortho to the hydroxyl radical. The term "phenol" as used in the present specification and claims is limited to the hydroxy monocyclic aromatic hydrocarbon or, stated otherwise, hydroxy benzene.

The preferred inhibitor will have the general structure indicated below:

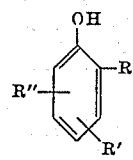

where R is an alkyl group and R' and R" are selected from the groups consisting of hydrogen and alkyl radicals. In general, it may be stated that preferred compounds comprise those in which at least one of the R, R' and R" groups is a branched chain alkyl group.

As hereinbefore set forth, the preferred inhibitor of the present invention contains an alkyl substituent in a position ortho to the hydroxyl radical of the phenol. Where R' and R" are both hydrogen atoms, the inhibitor includes such compounds as ortho-methyl phenol, ortho-ethyl phenol, ortho-isopropyl phenol, ortho-sec-butyl phenol, ortho-iso-butyl phenol, ortho-tert-butyl phenol, ortho-amyl phenols, etc. As hereinbefore set forth, it is preferred that R in the above general structure is a branched chain group including particularly isopropyl, tert-butyl and tert-amyl radicals.

As hereinbefore set forth, the preferred inhibitor of the present invention contains an alkyl substituent in a position ortho to the hydroxyl radical and may also contain other alkyl substituents attached to the benzene ring. Therefore, the inhibitor of the present invention includes the mono-, di- and trialkyl substituted phenols. Some of the preferred inhibitors of the present invention comprise the di- and trialkyl substituted phenols, the substituent groups preferably being in the 2 and also in the 4 and/or 6 positions. Dialkyl phenols include such compounds as 2,4-di-iso-propyl phenol, 2,4-di-sec-butyl phenol, 2,4-di-iso-butyl phenol, 2,4-di-tert-butyl phenol, similar isomers of amyl radicals, etc., 2-tert-butyl-4-methyl phenol, 2-tert-butyl-4-ethyl phenol, 2-tert-butyl-4-propyl phenol, 2-tert-amyl-4-methyl phenol, 2-tert-amyl-4-ethyl phenol, etc. The trialkyl substituted phenols include such compounds as 2,4-di-methyl-6-tert-butyl phenol, 2-methyl-4-ethyl-6-tert-butyl phenol, 2-methyl-4-propyl-6-tert-butyl phenol, 2,4,6-tri-methyl phenol, 2,4,6-tri-ethyl phenol, 2,4,6-tri-propyl phenol, 2,4,6-tri-sec-tert-amyl phenol, etc., 2,6-di-tert-butyl-4-methyl phenol, 2,6-di-tert-butyl-4-ethyl phenol, etc.

As hereinbefore set forth the particularly preferred inhibitors comprise those in which the substituent or substituents are alkyl groups. However, also included within the present invention are substituted phenols in which one or more of the substituent groups is a different hydrocarbon group including aralkyl, aryl, alkaryl and aryloxy radicals. Where the substituent group is an aralkyl radical, the inhibitor will comprise such compounds as 2-(phenyl methyl)phenol, 2-(beta-phenyl ethyl)phenol, 2-(beta-phenyl propyl)phenol, 2-(gamma-phenyl propyl)-phenol, 2-(beta-phenyl butyl)phenol, 2-(gamma-phenyl butyl)phenol, 2-(delta-phenyl butyl)phenol, etc., 3-(phenyl methyl)phenol, 3-(beta-phenyl ethyl)phenol, 3-(gamma-phenyl butyl)phenol, etc., 4-(phenyl methyl)-phenol, 4-(beta-phenyl ethyl)phenol, etc. It is understood that various additional hydrocarbon substituent groups may be attached to either of the rings.

When the substituent group comprises an aryl group the inhibitor will include such compounds as 2-phenyl phenol, 3-phenyl phenol, 4-phenyl phenol, which again may include additional hydrocarbon groups attached to either of the rings.

When the substituent group comprises an alkaryl radical, the inhibitor will include such compounds as 2-(4-methyl phenyl)phenol, 2-(4-ethyl phenyl)phenol, 2-(4-propyl phenyl)phenol, 2-(4-butyl phenyl)phenol, 2-(4-amyl phenyl)phenol, etc., 3-(4-methyl phenyl)phenol, 3-(4-ethyl phenyl)phenol, 3-(4-propyl phenyl)phenol, 3-(4-butyl phenyl)phenol, 3-(4-amyl phenyl)phenol, etc., 4-(4-methyl phenyl)phenol, 4-(4-ethyl phenyl)phenol, 4-(4-propyl phenyl)phenol, 4-(4-butyl phenyl)phenol, 4-(4-amyl phenyl)phenol, etc., 2-(3-methyl phenyl)-phenol, 2-(3-ethyl phenyl)phenol, 2-(3-propyl phenyl)- phenol, 2-(3-butyl phenyl)phenol, 2-(3-amyl phenyl)-phenol, etc., 2-(2-methyl phenyl)phenol, 2-(2-ethyl phenyl)phenol, 2-(2-propyl phenyl)phenol, 2-(2-butyl phenyl)phenol, 2-(2-amyl phenyl)phenol, etc.

When at least one of the substituent groups is an aryloxy radical, the inhibitor will include such compounds as 2-phenoxy phenol, 3-phenoxy phenol, 4-phenoxy phenol, 2-tert-butyl-4-phenoxy phenol, 2,5-di-tert-butyl-4-phenoxy phenol, etc. Diaryloxy substituted phenols include 2,4-di-phenoxy phenols, 2,4-di-phenoxy-6-tert-butylphenol, etc.

It is understood that the various compounds hereinbefore set forth are not necessarily equivalent. The choice as to the particular compound to use in any given instance will depend upon availability, cost, etc.

The inhibitor of the present invention will generally be added to the organo-siloxane in an amount of from about 0.01% to about 5% by weight and it may be added in any suitable manner. In general, the maximum effectiveness of the inhibitor will be obtained by adding the inhibitor to the organo-siloxane and then heating the mixture to an elevated temperature. The exact temperature to be used will depend upon the particular inhibitor and organo-siloxane employed.

I claim as my invention:

1. A method of stabilizing an organo-siloxane which comprises incorporating therein a small but effective amount of an inhibitor comprising a mono-hydroxy phenol having an alkyl substituent of from 1 to 5 carbon atoms in a position ortho to the hydroxyl radical, said phenol containing only one oxygen atom.

2. A method of stabilizing a liquid organo-siloxane which comprises adding thereto from about 0.01% to about 5% by weight of an inhibitor comprising an alkyl mono-hydroxy phenol having an alkyl substituent of from 1 to 5 carbon atoms in a position ortho to the hydroxyl radical, said phenol containing only one oxygen atom.

3. A method of stabilizing a liquid organo-siloxane which comprises adding thereto from about 0.01% to about 5% by weight of 2-tert-butyl phenol.

4. A method of stabilizing a liquid organo-siloxane which comprises adding thereto from about 0.01% to about 5% by weight of a 2,4-di-alkyl phenol.

5. A method of stabilizing a liquid organo-siloxane which comprises adding thereto from about 0.01% to about 5% by weight of 2,4-di-iso-propyl phenol.

6. A method of stabilizing a liquid organo-siloxane which comprises adding thereto from about 0.01% to about 5% by weight of 2,4-di-tert-butyl phenol.

7. A method of stabilizing a liquid organo-siloxane which comprises adding thereto from about 0.01% to about 5% by weight of a 2,4,6-tri-alkyl phenol.

8. A method of stabilizing a liquid organo-siloxane which comprises adding thereto from about 0.01% to about 5% by weight of 2,4-di-methyl-6-tert-butyl phenol.

9. A method of stabilizing a liquid organo-siloxane which comprises adding thereto from about 0.01% to about 5% by weight of 2,6-di-tert-butyl-4-methyl phenol.

10. A composition of matter comprising an organo-siloxane and a minor proportion of a mono-hydroxy phenol having an alkyl substituent of from 1 to 5 carbon atoms in a position ortho to the hydroxyl radical, said phenol containing only one oxygen atom.

11. A liquid organo-siloxane stabilized against deterioration containing from about 0.01% to about 5% by weight of a 2-alkyl mono-hydroxy phenol containing only one oxygen atom and having from 1 to 5 carbon atoms in the 2-alkyl substituent.

12. A liquid organo-siloxane stabilized against deterioration containing from about 0.01% to about 5% by weight of 2-tert-butyl phenol.

13. A liquid organo-siloxane stabilized against deterioration obtaining from about 0.01% to about 5% by weight of a 2,4-di-alkyl phenol.

14. A liquid organo-siloxane stabilized against deterioration containing from about 0.01% to about 5% by weight of 2,4-di-iso-propyl phenol.

15. A liquid organo-siloxane stabilized against deterioration containing from about 0.01% to about 5% by weight of 2,4-di-tert-butyl phenol.

16. A liquid organo-siloxane stabilized against deterioration containing from about 0.01% to about 5% by weight of a 2,4,6-tri-alkyl phenol.

17. A liquid organo-siloxane stabilized against deterioration containing from about 0.01% to about 5% by weight of 2,4-di-methyl-6-tert-butyl phenol.

18. A liquid organo-siloxane stabilized against deterioration containing from about 0.01% to about 5% by weight of 2,6-di-tert-butyl-4-methyl phenol.

References Cited in the file of this patent

UNITED STATES PATENTS

| Number | Name | Date |
|--------|------|------|
| 2,389,804 | McGregor | Nov. 27, 1945 |
| 2,470,447 | Van Gilder | May 17, 1949 |
| 2,517,536 | Chenicek | Aug. 8, 1950 |
| 2,581,907 | Smith | Jan. 8, 1952 |

OTHER REFERENCES

"Chem. and Engineering News," vol. 28, No. 35, Aug. 28, 1950, page 2967.